United States Patent
Kato

(10) Patent No.: US 12,498,232 B2
(45) Date of Patent: Dec. 16, 2025

(54) VEHICLE

(71) Applicant: SUBARU CORPORATION, Tokyo (JP)

(72) Inventor: Hideaki Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 94 days.

(21) Appl. No.: 18/403,580

(22) Filed: Jan. 3, 2024

(65) Prior Publication Data

US 2024/0240952 A1    Jul. 18, 2024

(30) Foreign Application Priority Data

Jan. 13, 2023    (JP) .................................. 2023-003740

(51) Int. Cl.
  *G01C 21/34*    (2006.01)
  *B60L 58/13*    (2019.01)
  *G01C 21/36*    (2006.01)

(52) U.S. Cl.
  CPC .......... *G01C 21/3469* (2013.01); *B60L 58/13* (2019.02); *G01C 21/3679* (2013.01); *G01C 21/3697* (2013.01); *B60L 2250/16* (2013.01); *B60L 2260/54* (2013.01)

(58) Field of Classification Search
  CPC .......... B60L 53/68; B60L 53/67; B60L 53/12; B60L 53/126; B60L 53/66; B60L 53/305; B60L 53/63; B60L 58/12; B60L 55/00; B60L 53/65; B60L 53/14; B60L 53/665; B60L 53/64; B60L 2260/50; B60L 2260/46; B60L 58/13; B60L 2260/54; B60L 2250/16; Y02T 10/7072; G01C 21/3697; G01C 21/3679; G01C 21/3469
  USPC ......................................................... 701/123
  See application file for complete search history.

(56) References Cited

U.S. PATENT DOCUMENTS

| | | | |
|---|---|---|---|
| 9,476,719 B2 * | 10/2016 | Meyer | G01C 21/26 |
| 12,110,001 B1 * | 10/2024 | Gudmundsson | B60W 30/18127 |
| 12,223,776 B1 * | 2/2025 | Kwitek | G07C 5/004 |
| 2014/0214267 A1 * | 7/2014 | Sellschopp | G06F 17/00 701/34.2 |
| 2023/0166615 A1 * | 6/2023 | Dow | B64C 39/024 701/3 |
| 2023/0166619 A1 * | 6/2023 | Dow | H02J 50/90 |

(Continued)

FOREIGN PATENT DOCUMENTS

JP    2013-167460 A    8/2013

*Primary Examiner* — Hai H Huynh
*Assistant Examiner* — Johnny H Hoang
(74) *Attorney, Agent, or Firm* — Rimon P.C.

(57) ABSTRACT

A vehicle includes a route processor and a processor. The route processor is configured to calculate a traveling route including a charging station or a wireless charging road that is set as a waypoint, based on a destination and a distance in which the vehicle is able to cruise. The vehicle is to be stopped and charged at the charging station. The vehicle is to travel and get charged on the wireless charging road. The processor is configured to, when displaying, on a display, a breakdown of an amount of electricity to be used to reach the destination on the traveling route display, on the display, an amount of electricity to be charged at the charging station and an amount of electricity to be charged along the wireless charging road in a distinguishable manner.

5 Claims, 7 Drawing Sheets

(56) References Cited

U.S. PATENT DOCUMENTS

| | | | |
|---|---|---|---|
| 2023/0194271 A1* | 6/2023 | Hanchett | B60L 53/62 |
| | | | 701/410 |
| 2024/0255299 A1* | 8/2024 | Mizuochi | B60H 1/00021 |
| 2024/0262376 A1* | 8/2024 | Miwa | B60L 58/12 |
| 2024/0278679 A1* | 8/2024 | Song | B60L 53/80 |
| 2024/0294169 A1* | 9/2024 | Basso | G01C 21/3469 |

* cited by examiner

VEHICLE

CROSS-REFERENCE TO RELATED APPLICATIONS

The present application claims priority from Japanese Patent Application No. 2023-003740 filed on Jan. 13, 2023, the entire contents of which are hereby incorporated by reference.

BACKGROUND

The disclosure relates to a vehicle.

In recent years, electric vehicles and plug-in hybrid vehicles including a storage battery that is chargeable by an external power source have been widely used from the viewpoint of environmental protection.

In driving a long distance by, for example, an electric vehicle, the electric vehicle is to be charged at a charging facility on a way to a destination along a traveling route to make it possible for the electric vehicle to reach the destination.

For example, Japanese Unexamined Patent Application Publication (JP-A) No. 2013-167460 discloses a technique regarding charging of, for example, an electric vehicle. The technique includes: calculating a traveling route in which charging facilities are set as stopover points based on data including, for example, a destination, current location data of the electric vehicle, and a remaining charge amount of a storage battery; and guiding the electric vehicle to the destination.

SUMMARY

An aspect of the disclosure provides a vehicle that includes a route processor and a processor. The route processor is configured to calculate a traveling route including a charging station or a wireless charging road that is set as a waypoint, based on a destination and a distance in which the vehicle is able to cruise. The vehicle is to be stopped and charged at the charging station. The vehicle is to travel and get charged on the wireless charging road. The processor is configured to, when displaying, on a display, a breakdown of an amount of electricity to be used to reach the destination on the traveling route, display, on the display, an amount of electricity to be charged at the charging station and an amount of electricity to be charged along the wireless charging road in a distinguishable manner.

An aspect of the disclosure provides a vehicle that includes circuitry configured to: calculate a traveling route comprising a charging station or a wireless charging road that is set as a waypoint, based on a destination and a distance in which the vehicle is able to cruise, the vehicle being to be stopped and charged at the charging station, the vehicle being to travel and get charged on the wireless charging road; and, when displaying, on a display, a breakdown of an amount of electricity to be used to reach the destination on the traveling route, display, on the display, an amount of electricity to be charged at the charging station and an amount of electricity to be charged along the wireless charging road in a distinguishable manner.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
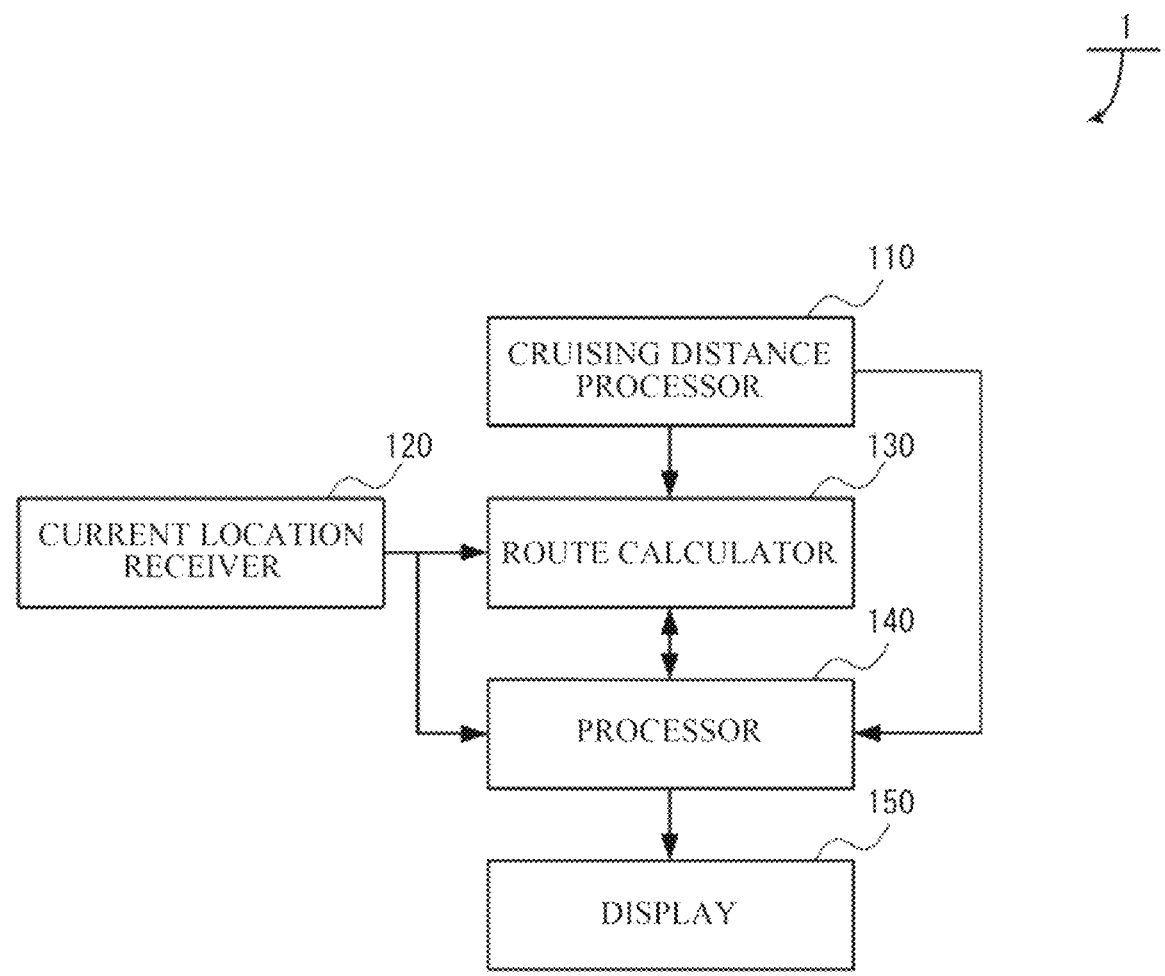
FIG. 1 is a diagram illustrating a configuration of a vehicle according to one example embodiment of the disclosure.

According to the technique disclosed in JP-A No. 2013-167460, information regarding necessity of charging at charging facilities set as stopover points is not provided to a driver who drives an electric vehicle. For this reason, if any of the charging facilities to which the electric vehicle is navigated is very crowded for example, the driver may possibly continue to travel without charging at the crowded charging facility, resulting in running out of electricity to reach a destination on a way along a traveling route.

It is desirable to provide a vehicle that visualizes data regarding an amount of electricity to be used to reach a destination and an amount of electricity to be charged at each of charging facilities set as waypoints.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Example Embodiment

A vehicle 1 according to an example embodiment of the disclosure will now be described with reference to FIGS. 1 to 3.

Configuration of Vehicle 1

Figure 2:
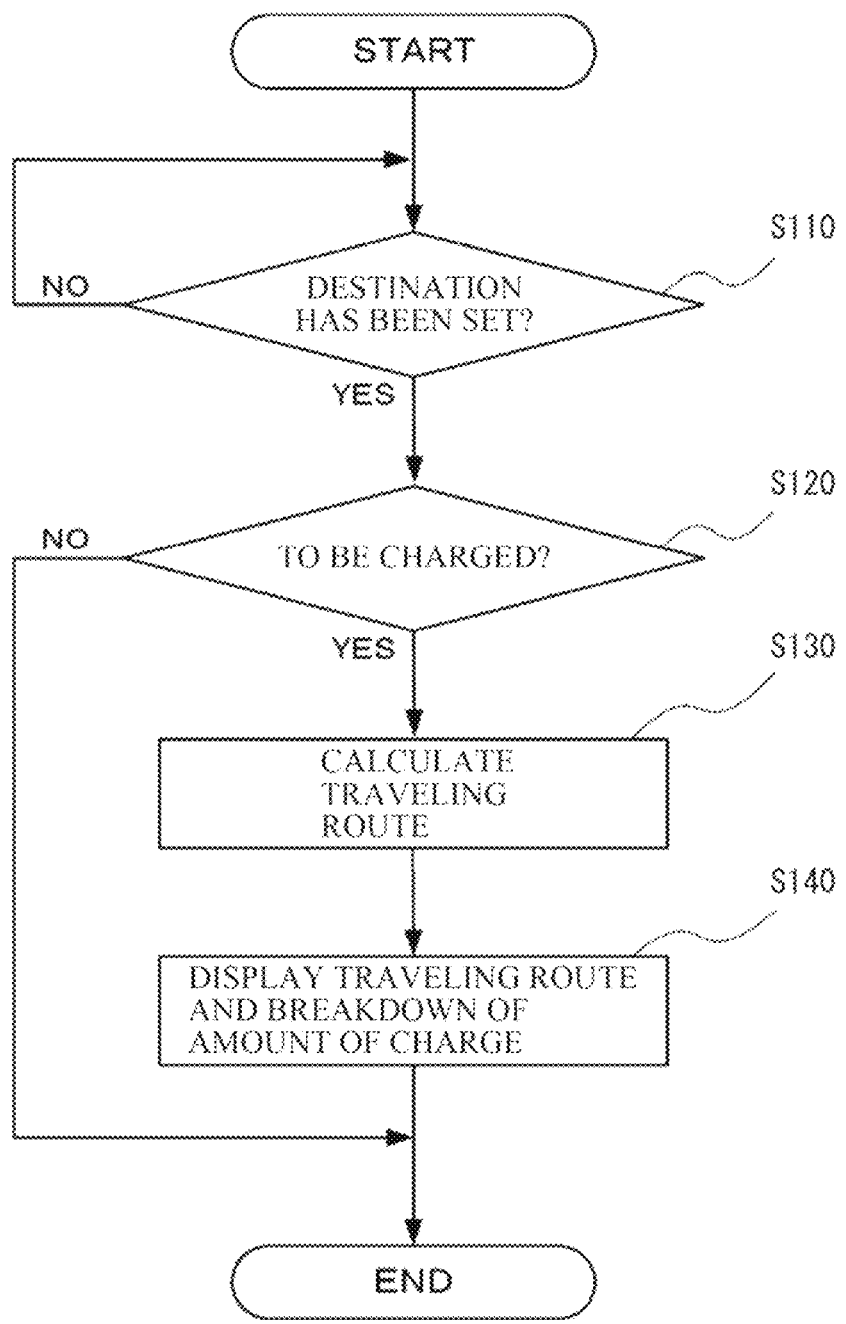
FIG. 2 is a flowchart illustrating a process performed by the vehicle of FIG. 1.

As illustrated in FIG. 1, the vehicle 1 serving as an own vehicle may include a cruising distance processor 110, a current location receiver 120, a route calculator 130, a processor 140, and a display 150. In one embodiment, the route calculator 130 may serve as a "route processor". In one embodiment, the processor 140 may serve as a "processor". In one embodiment, the display 150 may serve as a "display".

Note that the vehicle 1 is not limited to a four-wheeled vehicle and may be, for example, a two-wheeled vehicle. The vehicle 1 may travel on electric power from a storage battery.

The cruising distance processor 110 may calculate a distance in which the vehicle 1 is able to cruise, based on a remaining charge amount of a storage battery of the vehicle 1. As used herein, the distance in which the vehicle 1 is able to cruise may be referred to as a "cruising distance".

For example, the cruising distance processor 110 may calculate the cruising distance based on, for example, the remaining charge amount of the storage battery of the vehicle 1 and an actual value of an AC power consumption rate (a cruising distance per external charge of 1 kWh). The cruising distance processor 110 may transmit data regarding a result of the calculation and the remaining charge amount of the storage battery to the route calculator 130 and the processor 140, both of which will be described below.

Note that the cruising distance processor 110 may use any calculation method as long as the cruising distance of the vehicle 1 is calculated.

The current location receiver 120 may acquire a current location of the vehicle 1.

For example, the current location receiver 120 may be, for example, a GPS receiver. The current location receiver 120 may acquire the current location of the vehicle 1 and transmit the acquired current location data to the route calculator 130 and the processor 140, both of which will be described below.

The route calculator 130 calculates a traveling route including a charging station or a wireless charging road that is set as a waypoint based on a destination and the distance in which the vehicle 1 is able to cruise. The vehicle 1 is stopped and charged at the charging station. The vehicle 1 travels and gets charged on the wireless charging road. The charging station and the wireless charging road are hereafter collectively referred to as "charging facilities".

The route calculator 130 may calculate the traveling route including the charging facilities set as the waypoints with reference to, for example, map data and charging facility data acquired from a non-illustrated memory. The charging facility data may include, for example, data on a kind of charging facilities and data on location of charging facilities.

For example, the route calculator 130 may set a wireless charging road within the cruising distance from the current location as the waypoint in preference to a charging station. The route calculator 130 may set a charging station as the waypoint when there is no wireless charging road.

For example, the route calculator 130 may set the wireless charging road, which allows the vehicle 1 to be charged while traveling, as the waypoint in preference to the charging station to make it possible for a driver who drives the vehicle 1 to reach the destination in a shortest time. If it is determined that the vehicle 1 is unable to reach the destination with the amount of charge that is charged along the wireless charging road set as the waypoint, the route calculator 130 may further add a charging facility as the waypoint. In this manner, the route calculator 130 may calculate the traveling route.

The route calculator 130 may transmit data on the calculated traveling route and data regarding the charging facilities set as the waypoints to the processor 140, which will be described below. The data regarding the charging facilities may include, for example, the kind of the charging facility, the location of the charging facility, and the amount of electricity to be charged.

Note that the route calculator 130 may use any calculation method as long as the traveling route including the charging facilities set as the waypoints is calculated to make it possible for the vehicle 1 to reach the destination set by the driver.

The processor 140 may control operations of the entire vehicle 1 in accordance with control programs stored in, for example, a non-illustrated read-only memory (ROM).

In the example embodiment, the processor 140 displays, on the display 150, which will be described later, a breakdown of the amount of electricity to be used to reach the destination on the traveling route calculated by the route calculator 130.

When displaying, on the display 150, the breakdown of the amount of electricity to be used to reach the destination on the traveling route calculated by the route calculator 130, the processor 140 displays the amount of electricity to be charged at the charging station and the amount of electricity to be charged along the wireless charging road in a distinguishable manner.

For example, the processor 140 may generate a display image that visualizes data of the amount of electricity to be used to reach the destination and the amount of electricity to be charged at each of the charging facilities. The processor 140 may transmit the generated display image to the display 150, which will be described below.

Note that the information displayed by the processor 140 on the display 150 will be described below.

The display 150 may be, for example, a liquid crystal display (LCD). An example of the display 150 may be a display of a navigator mounted on the vehicle 1.

The display 150 may display the display image received from the processor 140.

Process Performed by Vehicle 1

The process performed by the vehicle 1 will be described with reference to FIG. 2.

The processor 140 may determine whether an occupant of the vehicle 1 has set the destination (step S110).

If it is determined that the occupant of the vehicle 1 has not set the destination ("NO" in step S110), the processor 140 may return the flow and enter a standby state.

If it is determined that the occupant of the vehicle 1 has set the destination ("YES" in step S110), the processor 140 may determine whether the storage battery of the vehicle 1 is to be charged to reach the destination (step S120).

If it is determined that the storage battery of the vehicle 1 is not to be charged ("NO" in step S120), the processor 140 may end the flow.

If it is determined, by the processor 140, that the storage battery of the vehicle 1 is to be charged ("YES" in step S120), the route calculator 130 may calculate the traveling route including the charging facilities set as the waypoints (step S130).

The processor 140 may display, on the display 150, the traveling route calculated in step S130 and the breakdown of the amount of electricity to be charged at each of the charging facilities set as the waypoints (step S140). Thereafter, the processor 140 may end the flow.

Information Displayed by Processor 140

The information displayed by the processor 140 on the display 150 in the above-described step S140 will be described with reference to FIG. 3.

The processor 140 may visualize data on the traveling route calculated by the route calculator 130 and data on the amount of electricity to be charged at each of the charging facilities. The processor 140 may display the visualized pieces of information on the display 150 to make the driver recognize the necessity to charge at the charging facilities that have been set.

Figure 3:
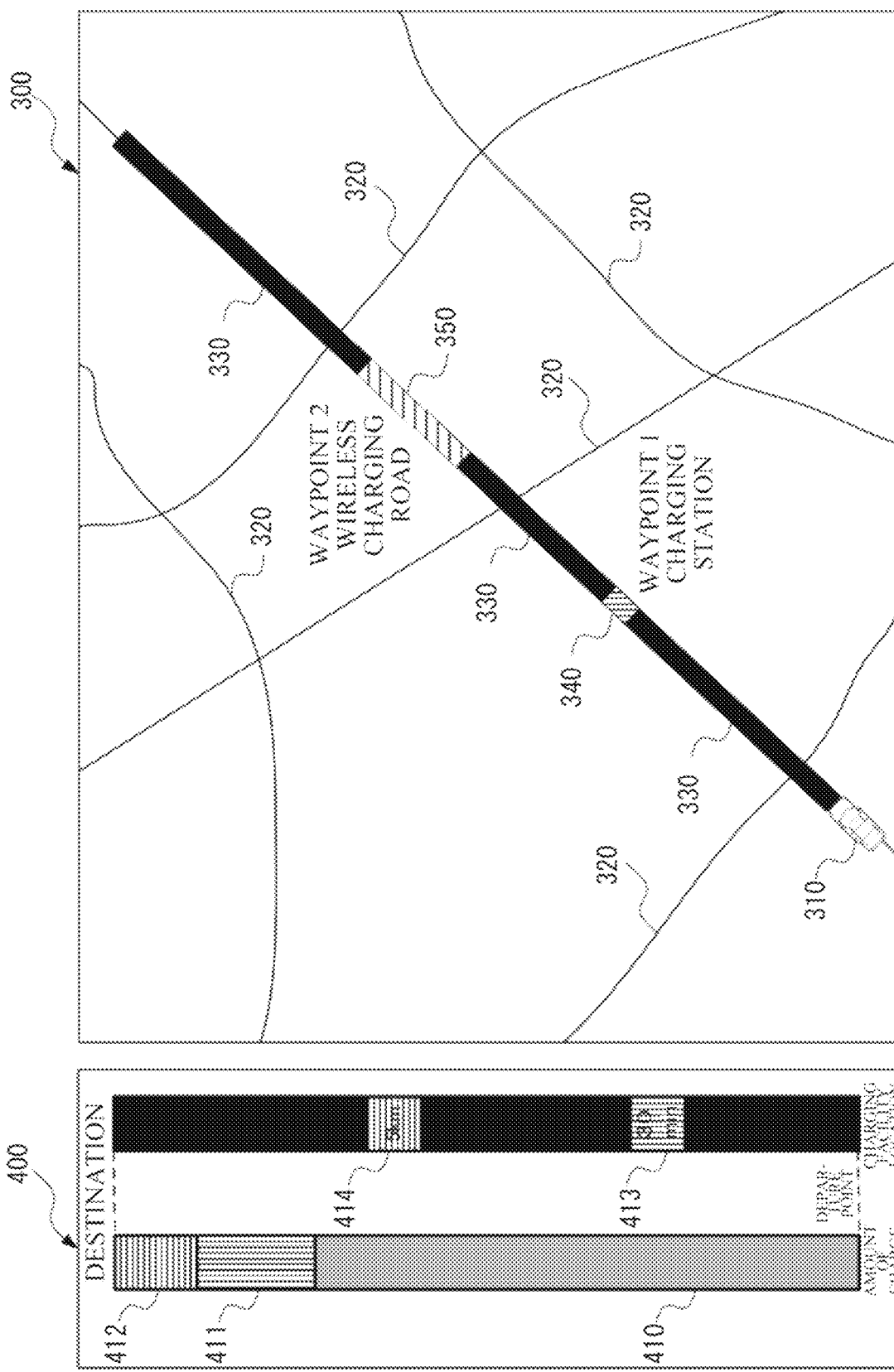
FIG. 3 is a diagram illustrating an example display on the vehicle of FIG. 1.

A display screen illustrated in FIG. 3 may be an example of displaying the information on the traveling route including the charging facilities set as the waypoints and the information of the amount of electricity to be charged at each of the charging facilities. The display screen may be an example display of the entire screen displayed on the display 150.

For example, the processor 140 may display a screen including a map display area 300 and a charge amount display area 400 on the display 150.

The processor 140 may display the information regarding each of the traveling route to the destination, the location of the charging facility, and the kind of the charging facility (charging station and wireless charging road) on the map display area 300.

For example, the processor 140 may display an own vehicle location 310, surrounding map information 320, and a traveling route 330 to the destination on the map display area 300.

For example, the processor 140 may display, on the map display area 300, the own vehicle location 310 based on the current location data of the vehicle 1 received from the current location receiver 120, the surrounding map information 320 acquired from a non-illustrated memory, and the traveling route 330 received from the route calculator 130.

Additionally, the processor 140 may display the location of the charging facilities (charging station location information 340 and wireless charging road location information 350) on the map display area 300 to make the driver recognize the necessity to charge in order that the vehicle 1 may reach the destination.

At this time, the processor 140 may change a display mode per charging facility to allow the driver to easily recognize whether each of the charging facilities set as the waypoints is the charging station or the wireless charging road.

For example, as illustrated in FIG. 3, the processor 140 may display the charging station location information 340 using, for example, a hatch pattern with parallel vertical lines and the wireless charging road location information 350 using, for example, a hatch pattern with parallel horizontal lines.

Note that the charging facilities may be displayed in any way as long as it is possible for the driver to easily distinguish the kind of charging facilities (the charging station and the wireless charging road). The kind of charging facilities may be displayed by any combination of, for example, a kind of color, a color density, a kind of hatch pattern, and a pictogram.

Additionally, as illustrated in FIG. 3, the processor 140 may also display textual information such as "Waypoint 1: charging station" and "Waypoint 2: wireless charging road" on the map display area 300.

The processor 140 may make the driver recognize that the vehicle 1 is to be charged to reach the destination by displaying, on the charge amount display area 400, the amount of electricity charged in the storage battery of the vehicle 1 and the amount of charge to be charged at each of the charging facilities.

For example, the processor 140 may display, on the charge amount display area 400, a bar graph in which the amount of electricity to be used to reach the destination from the current location is set as 100% as illustrated in FIG. 3.

For example, the processor 140 may calculate the ratio of each amount of electricity with respect to the sum total of the amount of electricity charged in the storage battery of the vehicle 1 when the traveling route is calculated, the amount of electricity to be charged at the charging station, and the amount of electricity to be charged along the wireless charging road. The sum total may correspond to the amount of electricity to be used to reach the destination from the current location. The processor 140 may display, on the charge amount display area 400, the bar graph indicating an amount of electricity 410 charged in the storage battery of the vehicle 1, an amount of electricity 411 to be charged at the charging station, and an amount of electricity 412 to be charged along the wireless charging road in accordance with the calculated ratio.

Additionally, when displaying, on the display 150, the breakdown of the amount of electricity to be used to reach the destination on the traveling route calculated by the route calculator 130, the processor 140 displays, on the display 150, the amount of electricity to be charged at the charging station and the amount of electricity to be charged along the wireless charging road in a distinguishable manner.

For example, the processor 140 may visualize the amount of electricity to be charged at each of the charging facilities and display the visualized amount of electricity on the charge amount display area 400 to make the driver recognize the influence that is exerted when the vehicle 1 is not charged at the charging facilities set as the waypoints.

For example, when the processor 140 displays the amount of electricity that the vehicle 1 lacks in order to reach the destination, or the amount of electricity with which the vehicle 1 is to be charged at the charging facilities, the processor 140 may display the amount of electricity 411 to be charged at the charging station and the amount of electricity 412 to be charged along the wireless charging road on the charge amount display area 400 in distinguishable display modes.

Note that the processor 140 may display the amount of electricity 411 to be charged at the charging station and the amount of electricity 412 to be charged along the wireless charging road using the hatch patterns that are the same as those used to display the charging facilities on the map display area 300.

In some embodiments, when displaying the amount of electricity 410 charged in the storage battery of the vehicle 1, the amount of electricity 411 to be charged at the charging station, and the amount of electricity 412 to be charged along the wireless charging road on the charge amount display area 400, the processor 140 may also display numerical values of the amounts of electricity.

In some embodiments, when displaying the breakdown of the amount of electricity to be used to reach the destination on the display 150, the processor 140 may display the location information of the waypoints (the charging facilities) on the traveling route together with the breakdown on the display 150.

For example, the processor 140 may display, on the charge amount display area 400, a bar graph in which a traveling distance to the destination from a departure point is set as 100% to make the driver recognize how far the vehicle 1 is able to travel when the vehicle 1 is not charged at the charging facilities and how far the vehicle 1 is able to travel when the vehicle 1 is charged at the charging facilities.

For example, the processor 140 may display the bar graph indicating a charging station location 413 and a wireless charging road location 414 on the right side of the above-described bar graph indicating the amount of charge in the storage battery.

Note that when displaying the charging station location 413 and the wireless charging road location 414, the processor 140 may use the hatch patterns that are the same as those used to display the amount of electricity 411 to be charged at the charging station and the amount of electricity 412 to be charged along the wireless charging road in a distinguishable manner.

In some embodiments, as illustrated in FIG. 3, the processor 140 may also display information including, for example, a charging time at the charging station such as "30 minutes" and a traveling distance along the wireless charging road such as "5 km".

An example has been given of a case in which the processor 140 displays the map display area 300 and the charge amount display area 400 on the display of the navigation device. In some embodiments, one or both of the map display area 300 and the charge amount display area 400 may be displayed on, for example, a meter panel disposed at a position where it is easier for the driver to check.

Workings and Example Effects

As described above, if it is determined that the vehicle 1 according to the example embodiment is unable to reach the destination set by the driver without charging at the charging facility, the vehicle 1 calculates the traveling route including the charging station or the wireless charging road set as the waypoint. The vehicle 1 is to be stopped and charged at the charging station. The vehicle 1 is to travel and get charged on the wireless charging road. The vehicle 1 displays, on the display 150, the breakdown of the amount of electricity to be used to reach the destination on the calculated traveling route.

The processor 140 may visualize the data including, for example, the amount of electricity 410 in the storage battery when the traveling route is calculated (the remaining charge amount), the amount of electricity that the vehicle 1 lacks in order to reach the destination (the amount of electricity 411 to be charged at the charging station and the amount of electricity 412 to be charged along the wireless charging road), the traveling route 330, the location of each of the charging facilities (the charging station location information 340 and the wireless charging road location information 350), the kind of charging facilities (the charging station and the wireless charging road), the charging time at the charging station, and the traveling distance along the wireless charging road. The processor 140 may display the visualized data on the map display area 300.

Additionally, the processor 140 may display the amount of electricity to be charged at each of the charging facilities (the amount of electricity 411 to be charged at the charging station and the amount of electricity 412 to be charged along the wireless charging road) in a distinguishable manner on the charge amount display area 400 to make the driver recognize the influence that is exerted when the vehicle 1 is not charged at each of the charging facilities set as the waypoints.

For example, the processor 140 may visualize the data regarding the amount of electricity to be used to reach the destination and the amount of electricity to be charged at each of the charging facilities set as the waypoints and display the visualized data. This helps to make the driver recognize the necessity to charge at the charging facilities set as the waypoints.

Even when any of the charging facilities to which the vehicle 1 is navigated is very crowded, the above configuration helps to prevent the driver from continuing to travel without charging the vehicle 1 at the crowded charging facility.

Additionally, the data on the amount of electricity in the storage battery of the vehicle 1 and the amount of electricity to be charged at each of the charging facilities may be visualized in the form of the bar graph and displayed in addition to the numerical values. This helps the driver to determine whether there is plenty of charge amount by simply looking at the display.

In some embodiments, when displaying the breakdown of the amount of electricity to be used to reach the destination on the display 150, the vehicle 1 may display the location information of the waypoints (the charging facilities) on the traveling route together with the breakdown on the display 150.

The vehicle 1 may also display, on the charge amount display area 400, the bar graph illustrating the location of the charging station set as the waypoint and the location of the wireless charging road set as the waypoint next to the bar graph illustrating information regarding the amount of charge.

Accordingly, how far the vehicle 1 is able to travel when the vehicle 1 is not charged at the charging facilities and how far the vehicle 1 is able to travel when the vehicle 1 is charged may be visualized. For example, as illustrated in FIG. 3, it may be visualized that the vehicle 1 is able to travel to the wireless charging road with the current amount of electricity 410 in the storage battery. This helps the driver to recognize the necessity to charge the vehicle 1 at the charging facilities set as the waypoints.

Modification 1

In some embodiments, when displaying the breakdown of the amount of electricity to be used to reach the destination on the display 150, the processor 140 may sequentially display the amount of electricity to be charged at each of the waypoints in accordance with an order of the waypoints (the charging facilities) that the vehicle 1 is to visit on the traveling route.

For example, the processor 140 may sequentially display the information such as the amount of electricity to be charged at each of the charging facilities on a charge amount display area 400A using an animation display to make it possible for the driver to easily recognize the necessity to charge the vehicle 1 at the charging facilities that have been set.

Display examples of the charge amount display area 400A using the animation display will be described with reference to FIGS. 4 to 6.

The processor 140 may display the information regarding the amount of charge of the vehicle 1, traveling route information, and charge facility information on the charge amount display area 400A.

For example, the processor 140 may display a first screen, a second screen, and a third screen, which will be described below, in a sequential manner to provide the driver with the information regarding the amount of charge, the traveling route information, and the charge facility information.

Figure 4:
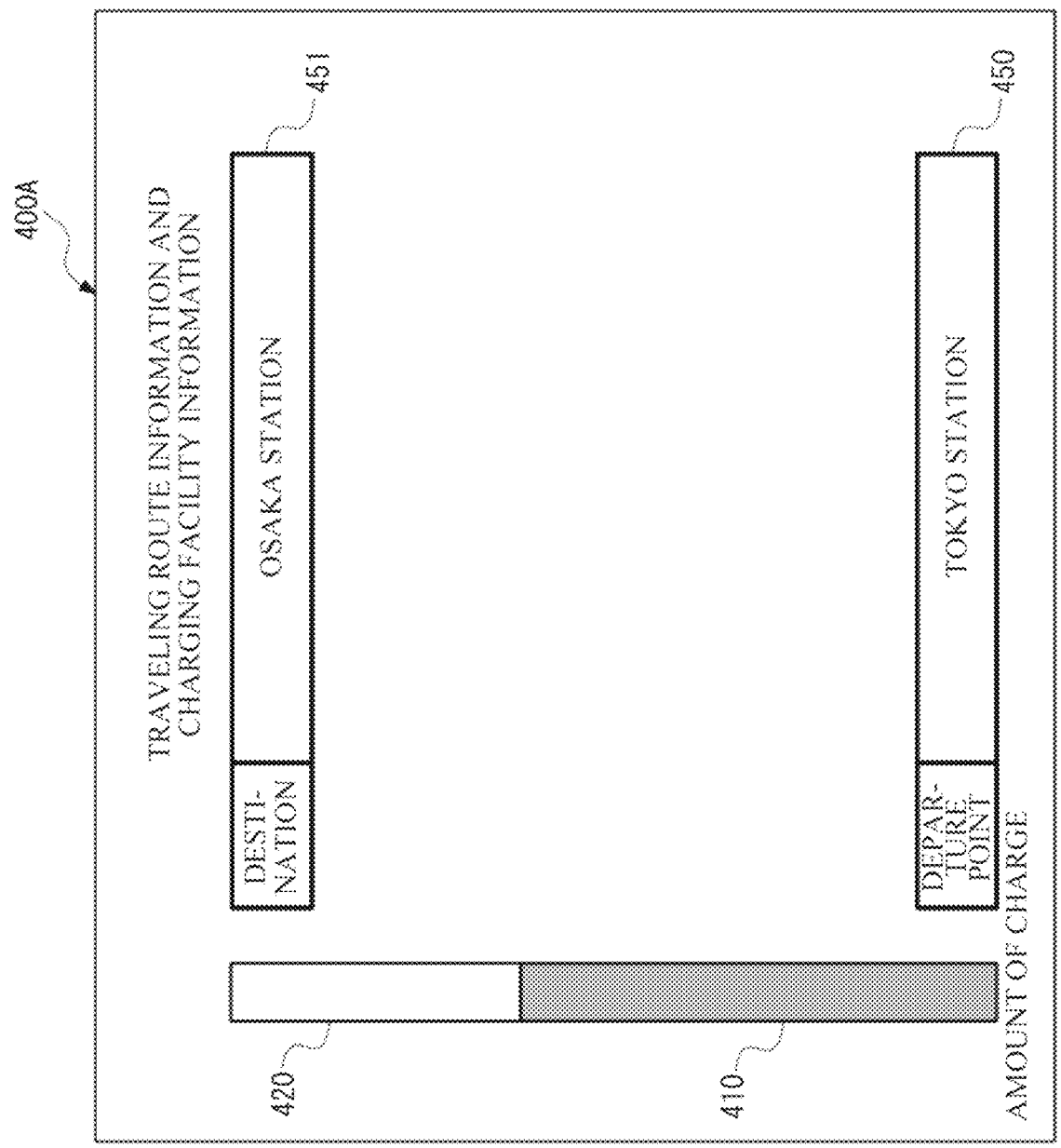
FIG. 4 is a diagram illustrating an example display on a vehicle according to one modification of the disclosure.

As illustrated in FIG. 4, the processor 140 may display, on the charge amount display area 400A, a departure point 450 and a destination 451 for the destination set by the driver, which may serve as the traveling route information and the charge facility information, and additionally, the amount of electricity 410 in the storage battery of the vehicle 1 when the traveling route is calculated by the route calculator 130 and the amount of electricity 420 that the vehicle 1 lacks in order to reach the destination, which may serve as the information regarding the amount of charge. This may correspond to the first screen.

Figure 5:
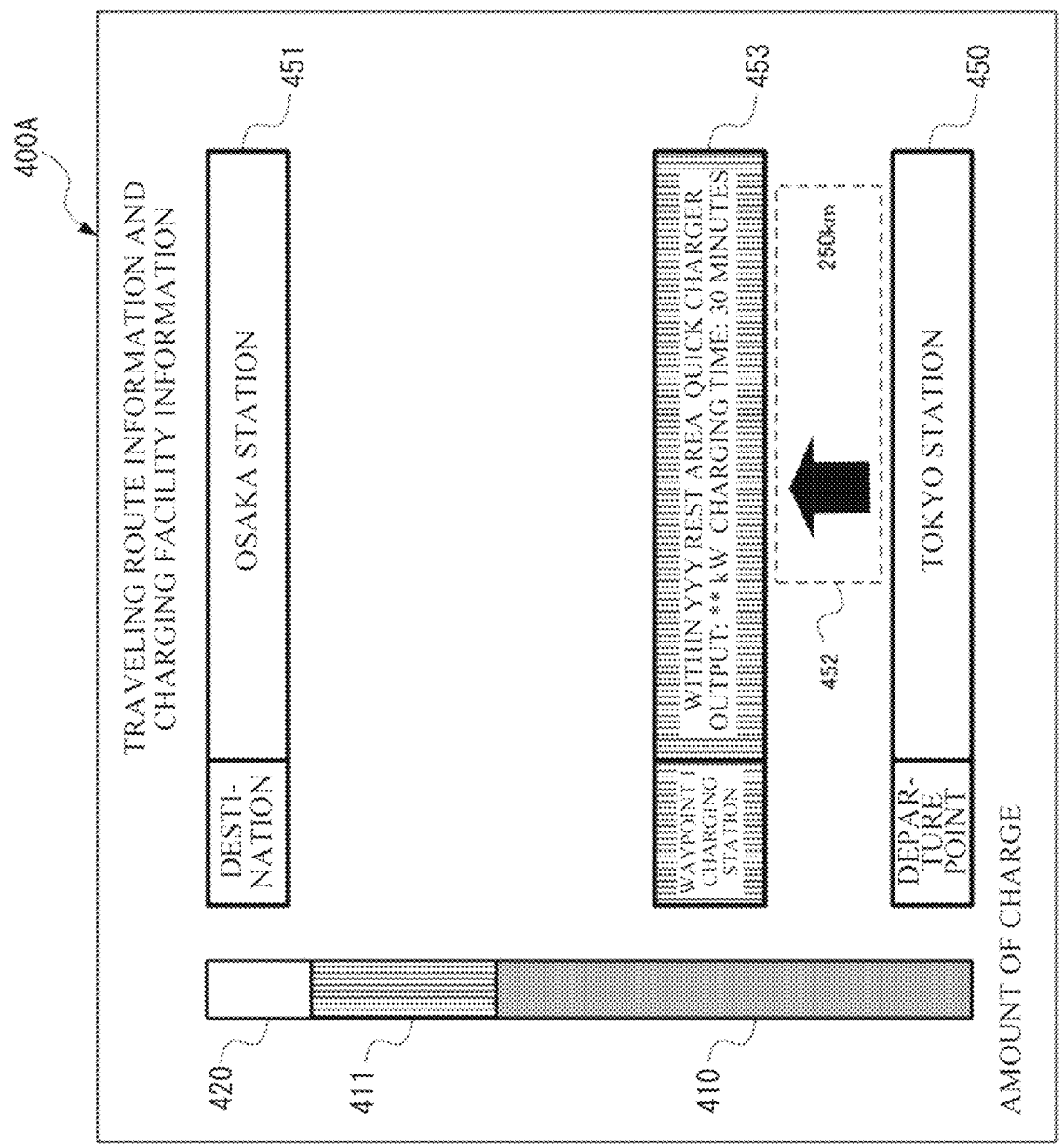
FIG. 5 is a diagram illustrating the example display on the vehicle according to one modification of the disclosure.

Thereafter, as illustrated in FIG. 5, the processor 140 may display information regarding the charging station set as Waypoint 1 by the route calculator 130 on the charge amount display area 400A. This may correspond to the second screen.

For example, the processor 140 may display an arrow 452 and charging facility information 453.

For example, the processor 140 may display animation in which the arrow 452, which is a black arrow, gradually extends upward. When the black arrow is entirely displayed, the processor 140 may pop up the charging facility information 453.

The processor 140 may display, on the charging facility information 453, information including, for example, the location of the charging station set as Waypoint 1, the output of the charging station, and the charging time.

Additionally, after popping up the charging facility information 453, the processor 140 may display the information on the amount of electricity 411 to be charged at the charging station set as Waypoint 1 on the charge amount display area 400A.

For example, the processor 140 may display the information regarding the amount of charge using an animation display. The animation display may include gradually extending the bar graph of the amount of electricity 411 to be charged at the charging station set as Waypoint 1 upward and gradually reducing the length of the bar graph of the amount of electricity 420 that the vehicle 1 lacks in order to reach the destination.

In some embodiments, the processor 140 may display the traveling distance to the charging facility from the departure point together with the arrow 452.

Figure 6:
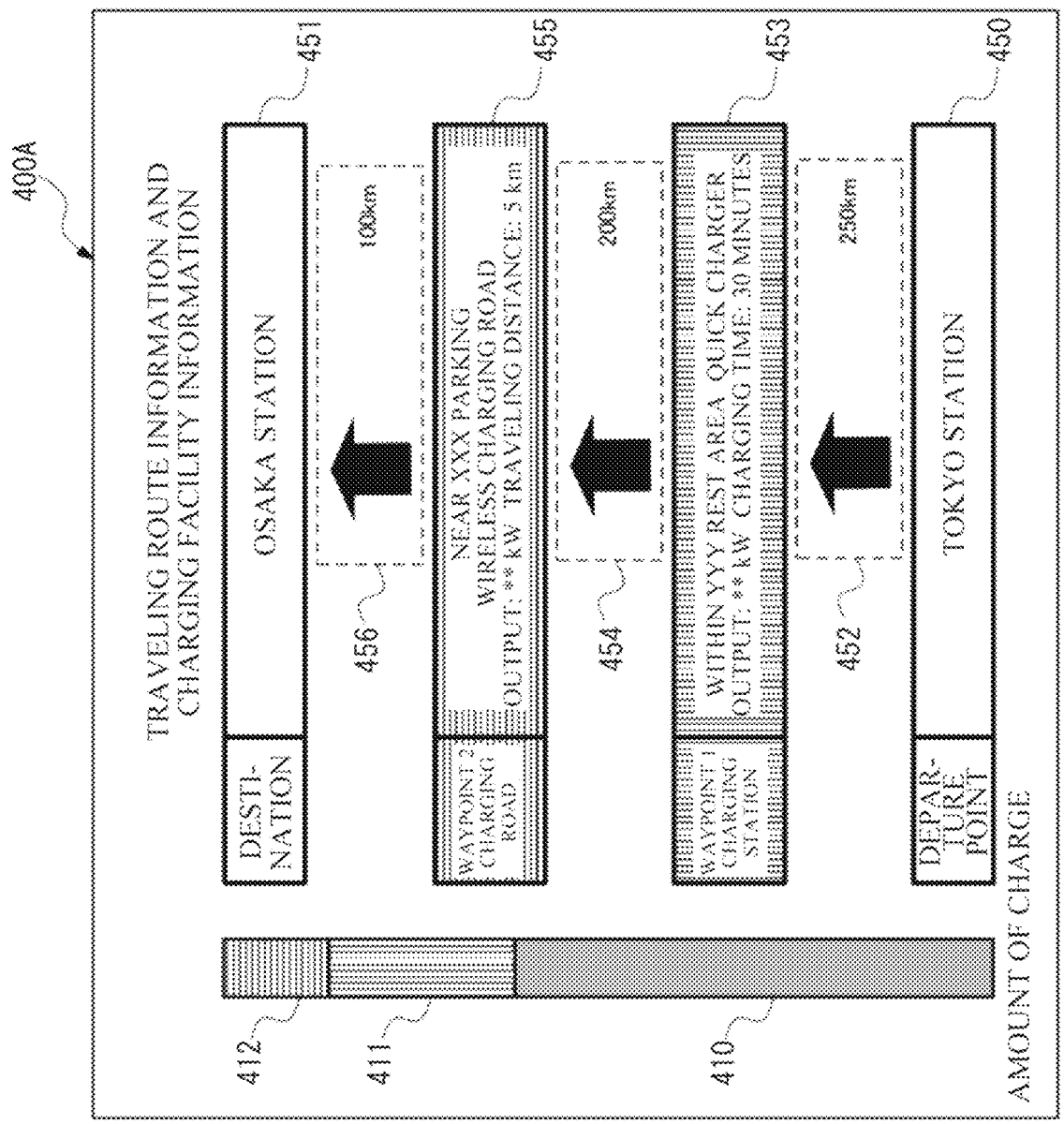
FIG. 6 is a diagram illustrating the example display on the vehicle according to one modification of the disclosure.

Thereafter, as illustrated in FIG. 6, the processor 140 may display information regarding the wireless charging road set as Waypoint 2 by the route calculator 130 on the charge amount display area 400A. This may correspond to the third screen.

For example, the processor 140 may display an arrow 454 and a charging facility information 455.

For example, the processor 140 may display animation in which the arrow 454, which is a black arrow, gradually extends upward. When the black arrow is entirely displayed, the processor 140 may pop up the charging facility information 455.

Note that the processor 140 may display information on, for example, the location of the wireless charging road set as Waypoint 2 and the traveling distance to the wireless charging road on the charging facility information 455.

Additionally, after popping up the charging facility information 455, the processor 140 may display the information on the amount of electricity 412 to be charged along the wireless charging road set as Waypoint 2 on the charge amount display area 400A.

For example, the processor 140 may display the information regarding the amount of charge using an animation display. The animation display may include gradually extending the bar graph of the amount of electricity 412 to be charged along the wireless charging road set as Waypoint 2 upward and gradually reducing the length of the bar graph of the amount of electricity 420 that the vehicle 1 lacks in order to reach the destination.

After displaying the animation described above, the processor 140 may display an arrow 456 on the charge amount display area 400A and end the flow.

In some embodiments, when displaying the animation described above on the charge amount display area 400A, the processor 140 may also display animation of the location information of the waypoints (the charging facilities) on the traveling route.

As described above, the processor 140 may sequentially display the first screen, the second screen, and the third screen on the charge amount display area 400A to make it possible for the driver to recognize the necessity to charge the vehicle 1 at each of the charging facilities.

Modification 2

In some embodiments, the information indicating the current location of the vehicle 1 may further be displayed in the example display of the vehicle 1 illustrated in FIG. 3.

Figure 7:
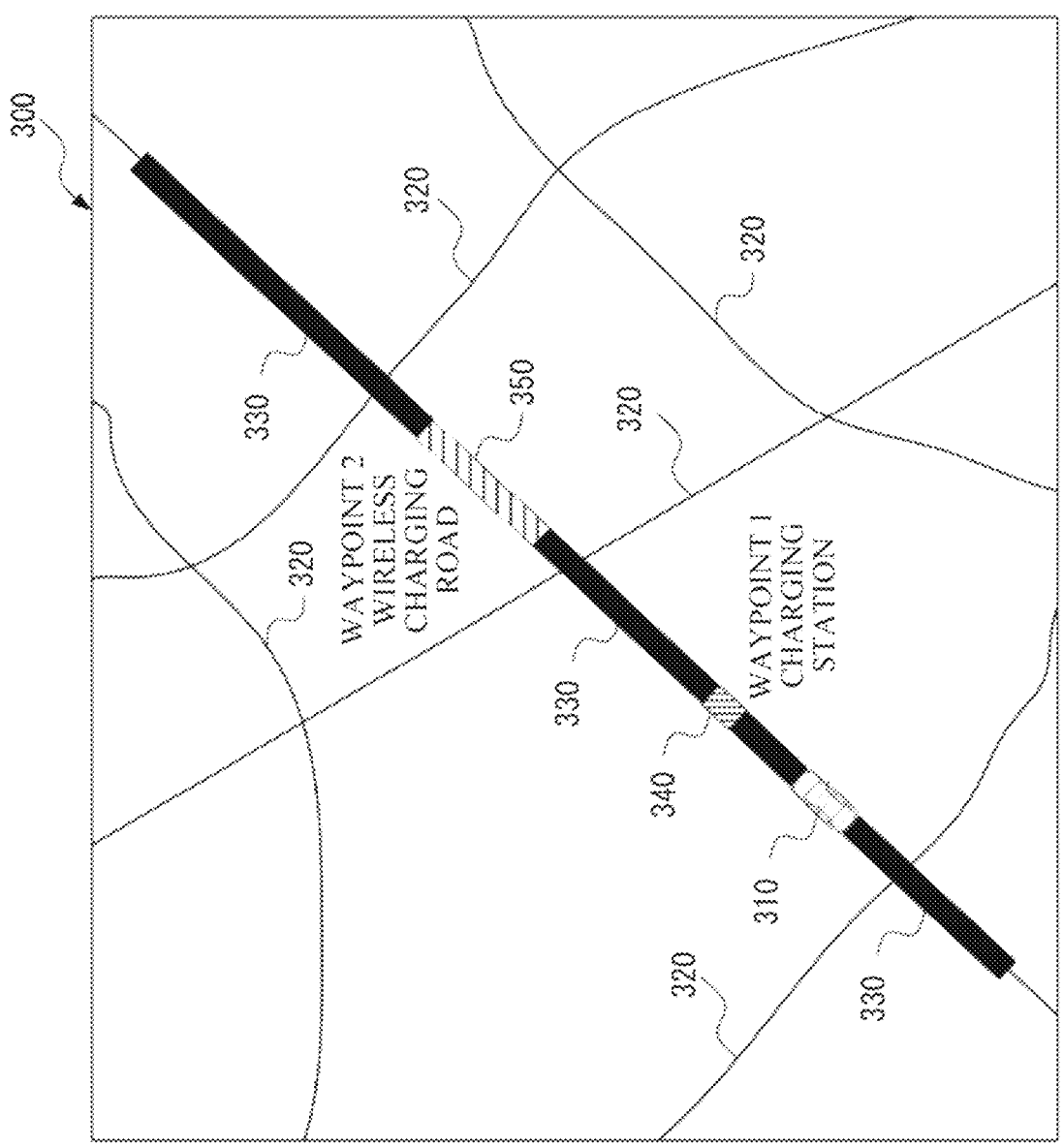
FIG. 7 is a diagram illustrating an example display on a vehicle according to one modification of the disclosure.
Figure 7:
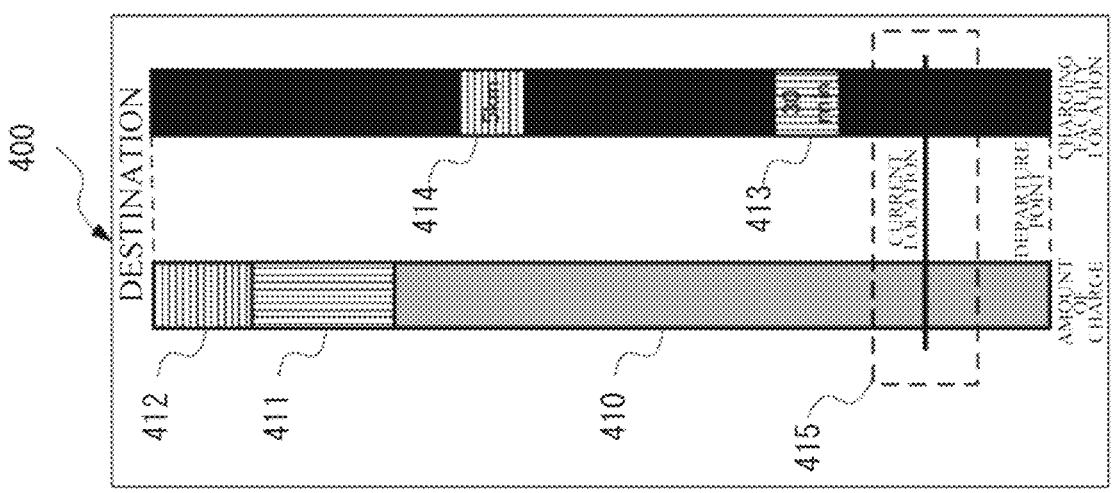

For example, as illustrated in FIG. 7, the processor 140 may move the display of the own vehicle location 310 based on the current location data acquired from the current location receiver 120 and display a current location marker 415 indicating the current location of the vehicle 1.

For example, the amount of electricity consumed by the vehicle 1 from the departure point up to the current traveling location and the current remaining charge amount of the vehicle 1 may be visualized by displaying the current location marker 415 on the charge amount display area 400. This makes it possible for the driver to easily grasp the current state of charge of the vehicle 1.

In some embodiments, it is possible to implement the vehicle of the example embodiment of the disclosure by recording the process to be executed by the components including the cruising distance processor, the current location receiver, the route calculator, and the processor on a non-transitory recording medium readable by a computer system, and causing the computer system to load the program recorded on the non-transitory recording medium onto the components including the cruising distance processor, the current location receiver, the route calculator, and the processor to execute the program.

The computer system as used herein may encompass an operating system (OS) and a hardware such as a peripheral device.

In addition, when the computer system utilizes a World Wide Web (WWW) system, the "computer system" may encompass a website providing environment (or a website displaying environment). The program may be transmitted from a computer system that contains the program in a storage device or the like to another computer system via a transmission medium or by a carrier wave in a transmission medium. The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

In the example embodiment, an example has been given of a case in which the processor displays various pieces of information including, for example, the map information and the charging facility information on the display mounted on the vehicle; however, this is non-limiting. The processor may display various pieces of information on, for example, various devices such as a smartphone or a tablet of the occupant of the vehicle. Alternatively, the processor may project various pieces of information on a windshield or a space inside or outside the vehicle.

The vehicle according to at least one embodiment of the disclosure makes it possible to visualize the data regarding the amount of electricity to be used to reach the destination and the amount of electricity to be charged at each of the charging facilities set as the waypoints.

Each of the route calculator 130 and the processor 140 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the route calculator 130 and the processor 140. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the route calculator 130 and the processor 140 illustrated in FIG. 1.

The invention claimed is:

1. A vehicle comprising:
a memory configured to store map data and charging facility data, the charging facility data including i) data on a kind of charging facilities including a charging station or a wireless charging road and ii) data on a location of the charging facilities;
a GPS receiver configured to detect a current location of the vehicle using signals received from a Global Positioning System satellite;
a route processor coupled to the memory and configured to:
when detecting an input of a destination by an occupant of the vehicle, calculate a traveling route to the destination by using the map data and the charging facility data, the traveling route including the charging station or the wireless charging road on the traveling route, based on the destination and a distance in which the vehicle is able to cruise, the vehicle being to be stopped and charged at the charging station or the vehicle being to travel and get charged on the wireless charging road;
a display unit installed in the vehicle; and
a processor coupled to the display unit and configured to display the traveling route on the display unit when detecting the route processor calculated the traveling route,
wherein the processor is configured to:
display, on the display unit, the traveling route with a breakdown of an amount of electricity to be used to reach the destination on the traveling route; and
display, in the breakdown of the amount of electricity, an amount of electricity charged at the charging station or an amount of electricity charged on the wireless charging road separately.

2. The vehicle according to claim 1, wherein the processor is configured to when displaying the breakdown of the amount of electricity to be used to reach the destination on the display, display location information of a waypoint on the traveling route together with the breakdown on the display.

3. The vehicle according to claim 1, wherein the processor is configured to, when displaying the breakdown of the amount of electricity to be used to reach the destination on the display, sequentially display an amount of electricity to be charged at each of a plurality of the waypoints in accordance with an order of the waypoints that the vehicle is to visit on the traveling route.

4. The vehicle according to claim 2, wherein the processor is configured to, when displaying the breakdown of the amount of electricity to be used to reach the destination on the display, sequentially display an amount of electricity to be charged at each of a plurality of the waypoints in accordance with an order of the waypoints that the vehicle is to visit on the traveling route.

5. A vehicle comprising:
circuitry configured to:
store, in a memory, map data and charging facility data, the charging facility data including i) data on a kind of charging facilities including a charging station or a wireless charging road and ii) data on a location of the charging facilities;
detect, using a GPS receiver, a current location of the vehicle using signals received from a Global Positioning System satellite;
when detecting an input of a destination by an occupant of the vehicle, calculate a traveling route to the destination by using the map data and the charging facility data, the traveling route including the charging station or the wireless charging road on the traveling route, based on the destination and a distance in which the vehicle is able to cruise, the vehicle being to be stopped and charged at the charging station or the vehicle being to travel and get charged on the wireless charging road;
display, on a display unit installed on the vehicle, the traveling route when detecting that the traveling route is calculated;
display, on the display unit, the traveling route with a breakdown of an amount of electricity to be used to reach the destination on the traveling route; and
display, in the breakdown of the amount of electricity, an amount of electricity charged at the charging station or an amount of electricity charged along the wireless charging road separately.

* * * * *